(12) United States Patent
Pechanec et al.

(10) Patent No.: US 8,782,215 B2
(45) Date of Patent: Jul. 15, 2014

(54) PERFORMANCE TESTING IN A CLOUD ENVIRONMENT

(75) Inventors: Jirí Pechanec, Mokra-Horakov (CZ); Martin Večeřa, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 232 days.

(21) Appl. No.: 13/118,961

(22) Filed: May 31, 2011

(65) Prior Publication Data
US 2012/0311128 A1   Dec. 6, 2012

(51) Int. Cl.
G06F 15/173 (2006.01)
G06F 11/34 (2006.01)
H04L 29/08 (2006.01)
H04L 12/26 (2006.01)
G06F 11/30 (2006.01)

(52) U.S. Cl.
CPC ........ *G06F 11/3433* (2013.01); *H04L 67/1012* (2013.01); *H04L 43/16* (2013.01); *G06F 11/301* (2013.01)
USPC ....................................... 709/224; 370/241.1

(58) Field of Classification Search
None
See application file for complete search history.

(56) References Cited

U.S. PATENT DOCUMENTS

| | | | |
|---|---|---|---|
| 6,697,964 B1 * | 2/2004 | Dodrill et al. | 714/38.13 |
| 6,823,380 B1 * | 11/2004 | Nace et al. | 709/224 |
| 2003/0074606 A1 * | 4/2003 | Boker | 714/42 |
| 2005/0228875 A1 * | 10/2005 | Monitzer et al. | 709/221 |
| 2009/0271152 A1 * | 10/2009 | Barrett | 702/186 |
| 2010/0185766 A1 * | 7/2010 | Sano et al. | 709/226 |
| 2010/0198960 A1 * | 8/2010 | Kirschnick et al. | 709/224 |
| 2012/0102163 A1 * | 4/2012 | Witt et al. | 709/221 |

FOREIGN PATENT DOCUMENTS

WO    WO 2007038953 A1 *   4/2007

* cited by examiner

*Primary Examiner* — Ian N Moore
*Assistant Examiner* — Eric P Smith
(74) *Attorney, Agent, or Firm* — Lowenstein Sandler LLP (57) ABSTRACT

A test controller provisions a load generation unit and instructs the load generation unit to generate a load and apply the load to a first application server instance in a cloud computing environment. The test controller measures a performance level of the first application server instance to determine if the first application server instance reaches a saturation point. If the first application server instance reaches the saturation point, the test controller records a performance statistic of the first application server instance.

12 Claims, 6 Drawing Sheets

PERFORMANCE TESTING IN A CLOUD ENVIRONMENT

TECHNICAL FIELD

This disclosure relates to the field of performance testing and, in particular, to performance testing in a cloud environment.

BACKGROUND

Cloud computing refers to the access of computing resources over a computer network. A common shorthand for a cloud computing service (or an aggregation of all existing cloud services) is "the cloud." Cloud computing allows for a functional separation between the computing resources used and the physical machine where the user is working. The computing resources may reside in a local network or outside the local network, for example, in an internet connected datacenter. The user may access the resources in the cloud using a personal computer (PC), workstation, laptop computer, mobile phone, personal digital assistant (PDA) or the like. The principle behind the cloud is that any computer connected to the internet is connected to the same pool of computing power, applications, and files. For example, users can store and access personal files such as music, pictures, videos, and bookmarks or play games or use productivity applications on a remote server rather than physically carrying around a storage medium such as a DVD or hard drive.

Since the cloud is the underlying delivery mechanism, cloud based applications and services may support any type of software application or service in use today. All of the development and maintenance tasks involved in provisioning the applications are performed by a service provider. The user's computer may contain very little software or data (perhaps a minimal operating system and web browser only), serving as little more than a display terminal for processes occurring on a network of computers, potentially located far away. Cloud computing frees users from certain hardware and software installation and maintenance tasks through the use of simpler hardware that accesses a vast network of computing resources (processors, servers, data storage devices, etc.). The sharing of resources reduces the cost to individuals. Users can now routinely use data intensive applications driven by cloud technology which were previously unavailable due to cost and deployment complexity.

In some systems, the cloud may spawn a new server instances (e.g., application server instances) in response to the load received from users' devices. One problem with conventional systems, however, is that since the cloud can handle relatively large loads, it may be difficult or impossible for a single user on a single user machine to generate a load large enough to cause the cloud to spawn new server instances. Thus, the cloud may not need to spawn a new server instance when tested by a single user machine, and the functionality of the cloud may not be properly tested.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments are described for performance testing in a cloud environment. In one embodiment, a test controller provisions a load generation unit and instructs the load generation unit to generate a load and apply the load to a first application server instance in a cloud computing environment. The test controller measures a performance level of the first application server instance to determine if the first application server instance reaches a saturation point. If the first application server instance reaches the saturation point, the test controller records a performance statistic of the first application server instance. The cloud may be configured to automatically provision another application server instance in response to the first instance reaching the saturation point. The test controller is configured to generate a load to force this automatic provisioning so that a user or system administrator can verify that the cloud is functioning properly. Having the load generation units in the cloud may allow a single user to generate sufficient load to verify performance of the entire cloud. The performance testing may simulate real-world conditions, so that the cloud will perform accordingly to handle a load as simulated in the test.

Figure 1:
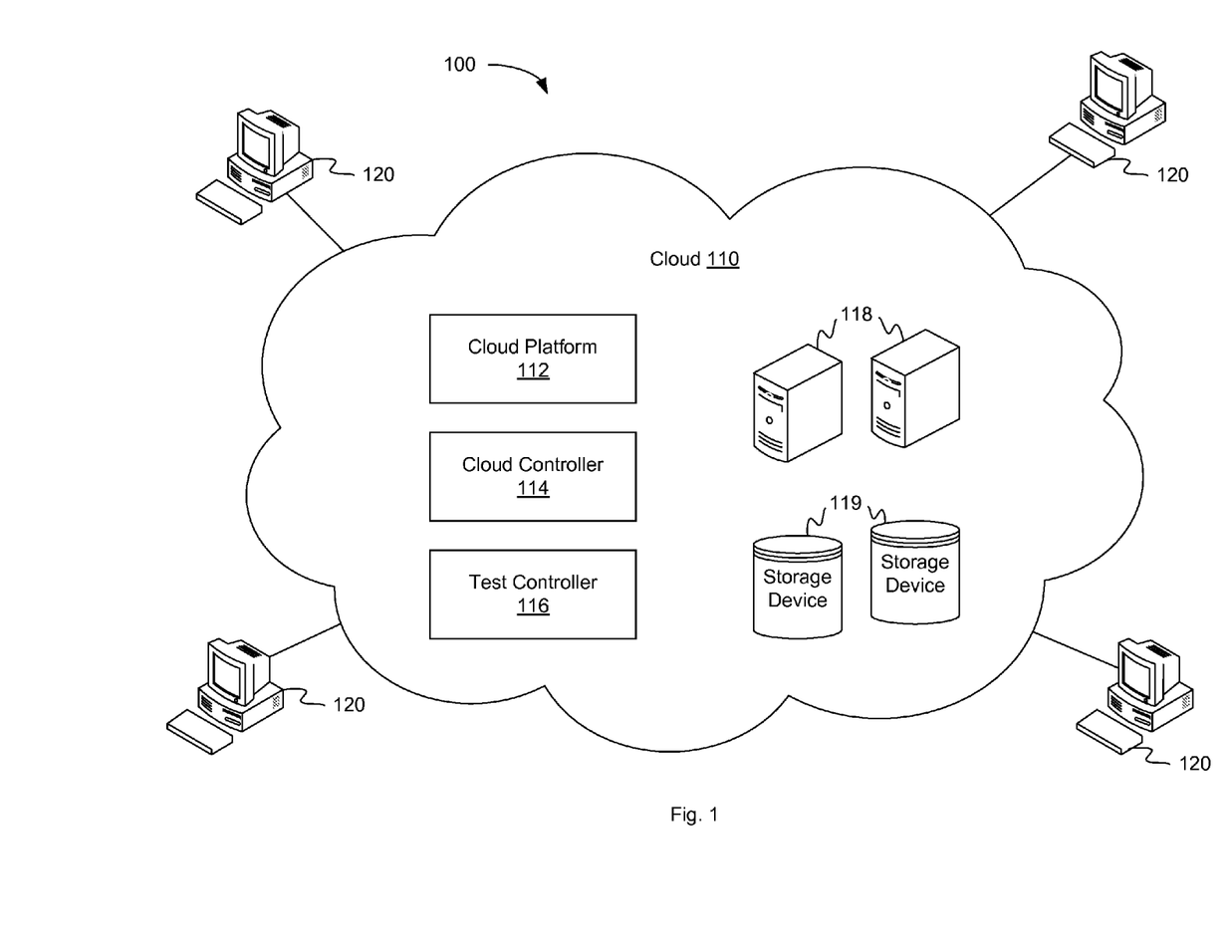
FIG. 1 is a block diagram illustrating a cloud computing environment for performance testing, according to an embodiment.

FIG. 1 is a block diagram illustrating a cloud computing environment for performance testing, according to an embodiment of the present invention. In one embodiment, cloud computing environment 100 includes cloud 110 and one or more user devices 120. User devices 120 may be used by a user to access the resources of the cloud 110, and may include a personal computer (PC), workstation, laptop computer, mobile phone, personal digital assistant (PDA) or the like. Cloud 110 may include a group of networked computing resources accessible to the user devices 120 over a network, such as a local area network (LAN), a wide area network (WAN), a global area network (GAN) such as the Internet, or a combination of such networks. The resources available in the cloud 110 may include, for example, processing devices, storage devices, applications, or other resources. The cloud 110 allows for a functional separation between the computing resources used and the user devices 120 where the user is working. The could 110 may provide access to a vast network of computing resources and allow users to use data or resource intensive applications driven by cloud technology which may or may not be available locally given the limitations of the user device 120.

In one embodiment could 110 includes cloud platform 112, cloud controller 114, test controller 116, one or more application servers (or application server instances) 118, and one or more storage devices 119. Each of these resources may be located at the same location or at different locations, and may be connected to one other and/or to user devices 120 through the network, as discussed above. Storage devices 119 may be, for example, memory, such as read-only memory (ROM), flash memory, random access memory (RAM), etc., or a mass storage device, such as a magnetic or optical storage device, or a combination thereof. In one embodiment, user devices 120 may interact directly with could platform 112. Cloud platform 112 may be software configured to provide access to the other resources in the cloud 110. Cloud platform 112 may cause the cloud resources, such as application servers 118 or storage devices 119, to appear, for example, as a web page or as a virtual machine on user device 120.

Cloud platform 112 may pass messages between user devices 120 and cloud controller 114. In one embodiment, cloud controller 114 is responsible for managing operations of all of the resources in the cloud 110. For example, cloud controller 114 may be responsible for spawning new instances of application server 118 or provisioning a new storage device 119 in response to the demand or load from user devices 120. Provisioning a new instance of an application server 118 may involve starting another actual physical machine and starting the new instance of the application server on that physical machine. Alternatively, cloud controller 114 may provision available computing resources to form a virtual application server that runs the new instance of application server 118. Cloud controller 114 may also be responsible for spawning load generation units (e.g., client devices or slave devices) which can apply a load to application servers 118 or other cloud resources. Spawning a load generation unit may similarly involve starting a physical machine or provisioning a virtual machine, and executing a load generation application thereon.

In one embodiment, cloud controller 114 may include the feature of provisioning new servers (e.g., spawning new instances of application server 118) to handle increased load. The load, for example, may include Hypertext Transfer Protocol (HTTP) requests made by user devices 120 (or the load generation units in cloud 110) to application servers 118. In other embodiments, the load may include other messages, such as messages using the Java Messaging Services (JMS). Since the cloud controller 114 may automatically provision new servers as needed, the cloud 110 can handle large loads, such as those that might occur during a period of peak usage. In one embodiment, it may be desirable to test how cloud controller 114 responds to certain load conditions to determine whether cloud controller 114 spawns or removes application server instances 118 appropriately.

In one example, cloud controller 114 may spawn a new application server instance 118, when the current application server (or group of application servers) reaches a saturation point. The saturation point may be defined as the point when the performance level of the application servers 118 drops below a certain threshold, starts decreasing, or when it is unable to handle additional requests. The performance level of the application servers 118 may be measured, for example, in terms of a number of requests processed per second, an average response time to a request, a number of processor transactions per second, or in some other way. One problem with conventional systems is that, since cloud 110 can handle relatively large loads, it may be difficult or impossible for a single user on a single user machine 120 to generate a load large enough to cause application servers 118 to reach the saturation point. Thus, cloud controller 114 may not need to spawn a new application server instance 118 when tested by a single user machine 120, and the functionality of cloud controller 114 may not be properly tested.

Test controller 116 may be designed to implement performance testing in the cloud environment in accordance with the embodiments of the present invention. Test controller 116 may be configured to request the spawning of load generation units in the cloud 110, and to cause the units to generate a load to be applied to application servers 118. This load may be dynamically controllable by test controller 116 in order to test the performance of the cloud 110 under various circumstances. In one embodiment, test controller 116 may generate a load to test the behavior of application servers 118 at a peak usage level and/or to test the ability of cloud controller 114 to spawn or remove instances of application server 118 in response to changing load conditions. Additional details of test controller 116 will be provided below.

Figure 2:
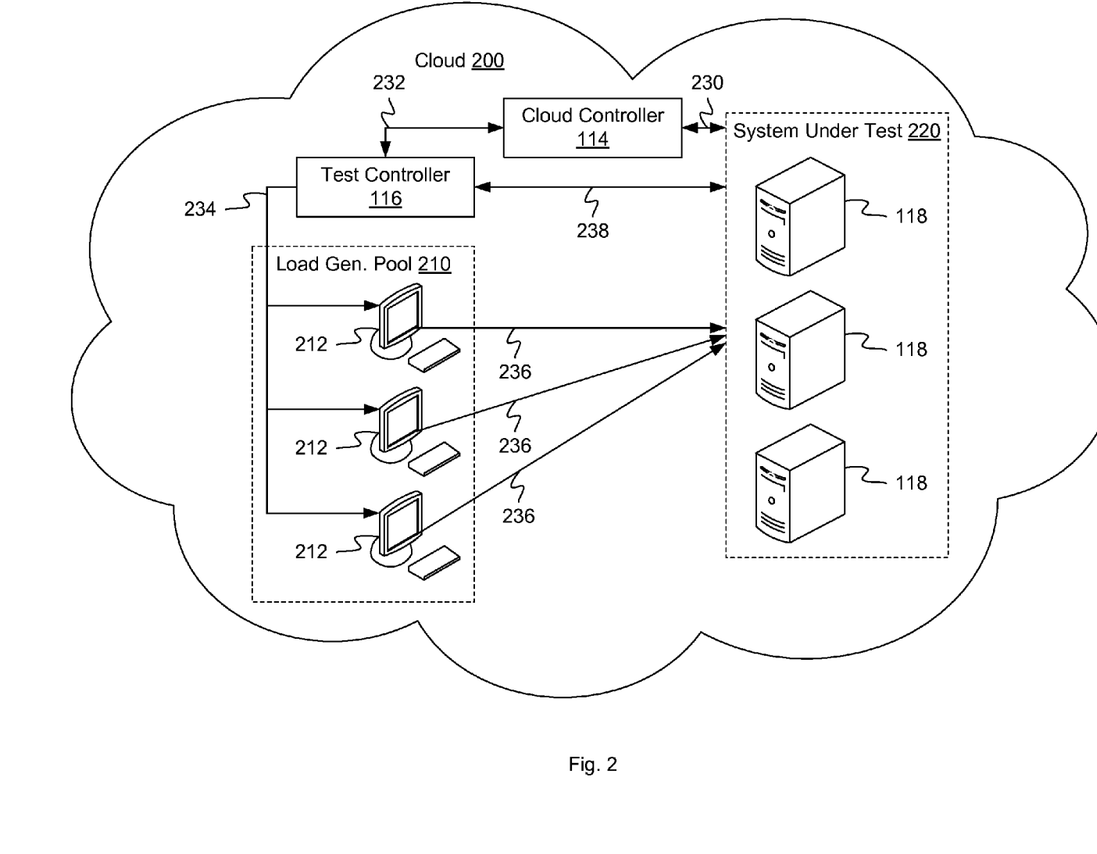
FIG. 2 is a block diagram illustrating a cloud computing environment for performance testing, according to another embodiment.

FIG. 2 is a block diagram illustrating a cloud computing environment for performance testing, according to another embodiment of the present invention. Cloud 200 may be one representation of the cloud 110, discussed above with respect to FIG. 1. In one embodiment, cloud 200 includes cloud controller 114 and test controller 116. In this embodiment, a number of application servers 118 in the cloud 200 are logically grouped together as system under test 220. Although the system under test 220 may include one or more application servers 118, system under test 220 may appear logically, to other devices inside or outside cloud 200, as a single application server. In one embodiment, the application servers 118 in system under test 220 may be controlled by cloud controller 114. In this embodiment, cloud 200 further includes load generation pool 210. Load generation pool 210 may be a logical grouping of one or more load generation units 212 designed to generate a load (e.g., HTTP requests) and apply the load to the system under test 220. The load generation units in load generation pool 210 may be controlled by test controller 116.

As discussed above, cloud controller 114 may be responsible for provisioning new instances of application server 118 in system under test 220 in response to an applied load. Cloud controller 114 may monitor the performance level of system under test 220 over communication link 230. In one embodiment, communication link 230 may use simple network management protocol (SNMP), Java management extensions (JMX), or some other protocol to communicate between devices. If the performance level of the system under test 220 reaches the saturation point or some other threshold, cloud controller 114 may automatically provision a new instance of application server 118. The number of instances of application server 118 that may be provisioned may be limited by the available computing resources in the cloud 200 or may have a limit imposed by a user-defined or default setting. This limit may be imposed, for example, to simulate the processing capacity of a real world system. Similarly, if the performance level increases to the point where there are more computing resources than the load requires, cloud controller may deprovision or remove application server instances 118.

In one embodiment, in response to a command received from a user device or from a test scenario stored, for example, in storage device 119, test controller 116 may request, over communication link 232, that cloud controller 114 spawn a load generation unit 212 in load generation pool 210. Spawning a load generation unit 212 may similarly involve starting a physical machine or provisioning a virtual machine, each running a load generation application. Test controller 116 may instruct, over communication link 234, the newly provisioned load generation unit 212 to apply a load to the system under test 220. The load generation application on load generation unit 212 may generate the load and send it to system under test 220 over communication link 236. Test controller 116 may similarly monitor the performance level of the system under test 220 over communication link 238. If test controller 116 determines that the load on system under test 220 is not sufficient to cause system under test 220 to reach the saturation point or to cause cloud controller 114 to provision a new instance of application server 118, test controller 116 may request cloud controller 114 to provision another load generation unit 212, so that the load applied to system under test 220 may be increased. Each load generation unit 212 may have a practical limit to the size of the load it can generate (e.g., the number of HTTP requests it can generate at one time), but by adding additional load generation units 212 to load generation pool 210, the size of the load may be increased as needed. Test controller 116 may record performance statistics of system under test 220, received over communication link 238, and store the performance statistics, for example, in storage device 119. In one embodiment, cloud controller 114 may notify test controller 116 that a new application server instance 118 has been provisioned in system under test 220. In another embodiment, test controller 116 may monitor system under test 220 and detect when a new application server instance 118 is added.

Figure 3:
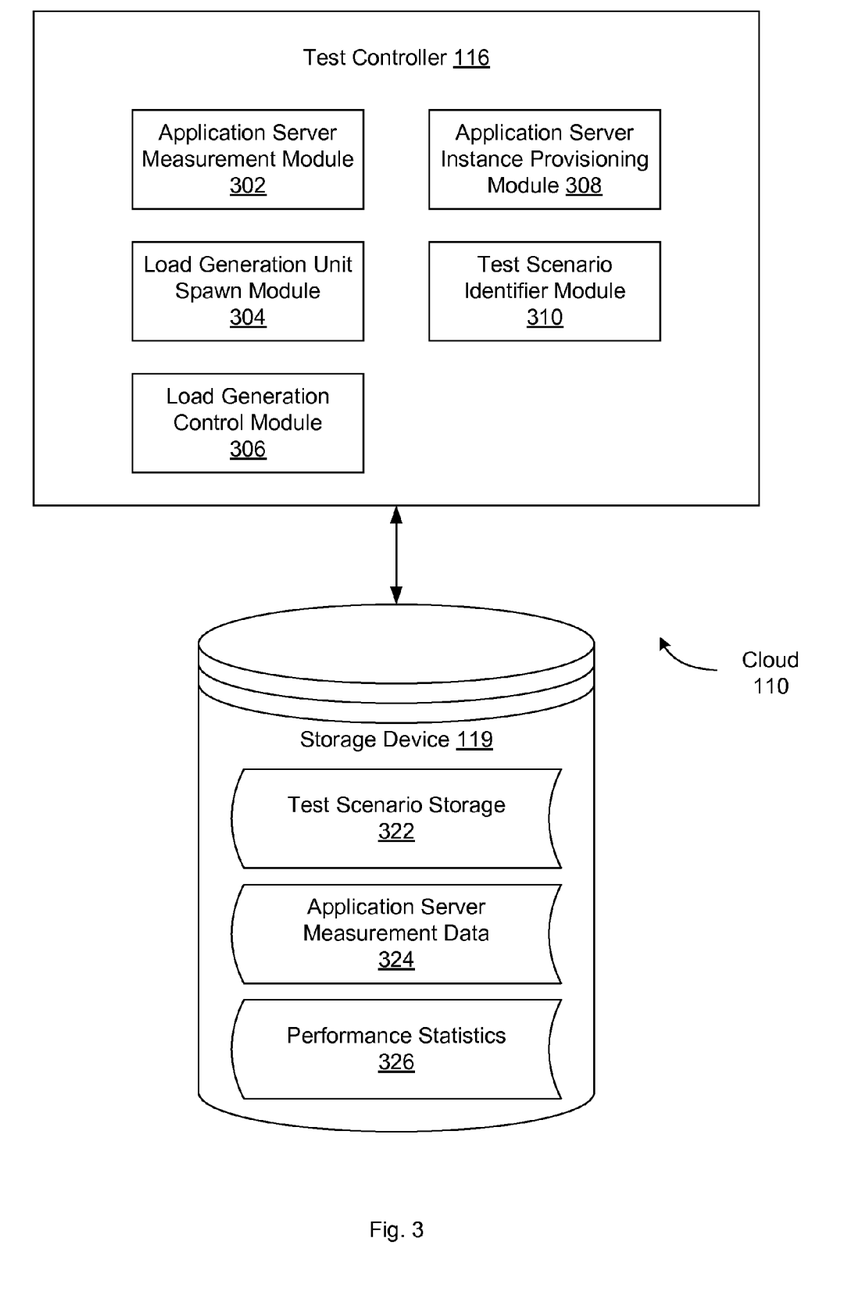
FIG. 3 is block diagram illustrating a test controller, according to an embodiment.

FIG. 3 is block diagram illustrating a test controller, according to an embodiment of the present invention. In one embodiment, test controller 116 may include application server measurement module 302, load generation unit spawn module 304, load generation control module 306, application server instance provisioning module 308, and test scenario identifier module 310. Test controller 116 may be coupled to storage device 119, which may include test scenario storage 322, application server measurement data 324 and performance statistics 326. Storage device 119 may be part of test controller 116 or may be part of another device in cloud 200.

Application server measurement module 302 may be configured to communicate with system under test 220 (application servers 118) over communication link 238. In one embodiment, the communications may include a performance measurement of system under test 220, such as a number of requests processed per second (or in some other unit of time), a response time for a request (or an average response time for a predetermined number of requests), a number of processor transactions per second, or some other measurement of performance. Application server measurement module 302 may store the performance measurement as application server measurement data 324 in storage device 119. Application server measurement module 302 may also receive performance statistics such as if and when a new application server instance 118 was provisioned or removed from system under test 220. Application server measurement module 302 may store this data as performance statistics 326 in storage device 119.

Load generation unit spawn module 304 may be configured to request that a new load generation unit 212 be spawned or provisioned in load generation pool 210. A load generation unit 212 may be a physical computer or a virtual set of computing resources configured to run a load generation application and generate a load, such as a number of HTTP requests. Each of the load generation units 212 may exist entirely within the cloud 200. In response to a command, such as user input received through user device 120, load generation unit spawn module 304 may send a request to cloud controller 114, over communication link 232, to spawn or remove a load generation unit 212. Cloud controller 114 is responsible for actually provisioning the new load generation unit. Once the new load generation unit 212 is spawned, load generation control module 306 may instruct the load generation unit 212 to generate a load and apply the load to system under test 220. Load generation control module 306 may also respond to a command from a user. In other embodiments, the load supplied by load generation units 212 may be based on memory consumption, processor usage, I/O messages, or some other factor, to load specific subsystems of system under test 220.

In one embodiment, test controller 116 may continue to spawn load generation units 212 and apply a load to system under test 220 until system under test 220 reaches a saturation point. The saturation point may be defined as the point at which the performance level of the system under test 220 drops below a certain threshold, starts decreasing, or when the system under test 220 is unable to handle additional requests. Application server measurement module 302 may continually monitor system under test 220 to determine when the saturation point is reached. At that point, application server measurement module 302 may record performance statistics of the system under test 220 so that the user, system administrator, or some other computer application program data may use the data to analyze the performance of the system under test 220 and/or the cloud 200 as a whole. In another embodiment, application server measurement module 302 may continually record performance statistics or record the statistics at some periodic interval.

In one embodiment, the number of load generation units 212 used and the size of the load generated, may be controlled by one or more predefined test scenarios. The test scenarios may have a number of conditions which define how and/or when the load should be applied to system under test 220. The test scenarios may be stored as test scenario storage 322 in storage device 119. Test scenario identifier module 310 may read test scenario storage 322 to determine how many load generation units 212 to spawn and what the size of the load should be. Load generation unit spawn module 304 and load generation control module 306 may respond accordingly. The conditions of the test scenario may be used in place of the user input to control the load generation pool 210. The test scenarios may be designed to simulate specific real-world conditions, such as for example a peak usage time for system under test 220. In one embodiment, rather than spawning load generation units 212 until the system under test 220 reaches the saturation point, load generation units 212 may be spawned and a load applied, until one or more conditions of the test scenario are met. At that time, application server measurement module 302 may similarly measure the performance of system under test 220 and store the results as performance statistics 326.

Test controller 116 may further include application server instance provisioning module 308. In some embodiments, according to certain test scenarios, it may be desirable to cause cloud controller 114 to provision additional application server instances 118 regardless of the load being applied to system under test 220. Application server instance provisioning module 308 may request, over communication link 232, that the cloud controller provision a new application server instance 118, in response to user input or in response to the test scenario.

Figure 4:
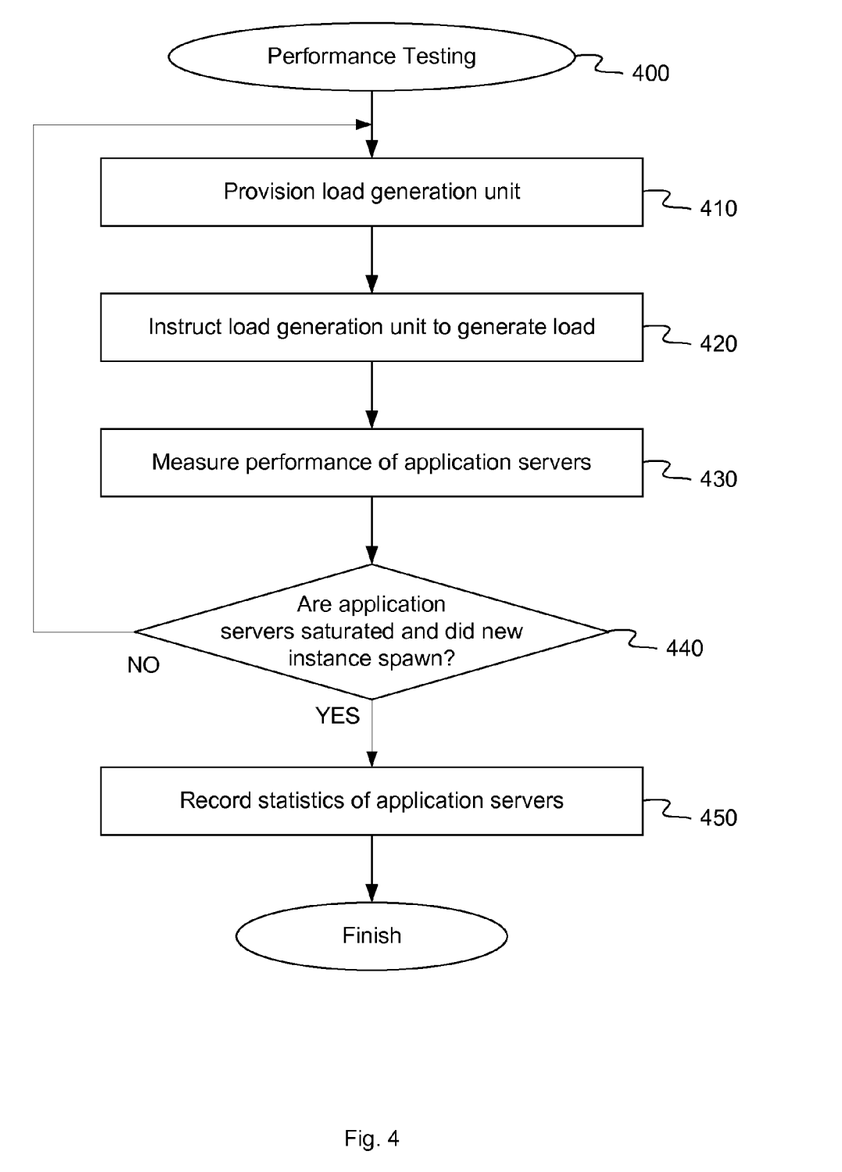
FIG. 4 is a flow diagram illustrating a performance testing method, according to an embodiment.

FIG. 4 is a flow diagram illustrating a performance testing method, according to an embodiment of the present invention. The method 400 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to test the performance of an application server or servers in a cloud based computing environment. In one embodiment, method 400 may be performed by test controller 116, as shown in FIGS. 1, 2 and 3.

Referring to FIG. 4, at block 410, method 400 provisions a load generation unit 212 in load generation pool 210. Load generation unit spawn module 304 in test controller 116 may request that cloud controller 114 provision a load generation unit 212. At block 420, method 400 instructs the load generation unit 212 to generate a load. Load generation control module 306 may send a message to the load generation unit 212 instructing it to generate a load of a certain size for a certain duration. The size of the load may be controlled, for example, by user input received from user device 120. In response, the load generation unit applies the load to system under test 220 and the application servers 118 residing therein.

At block 430, method 400 measures the performance of the application server(s) 118 in system under test 220. Application server measurement module 302 may monitor the performance of system under test 220 and store the measurement as application server measurement data 324 in storage device 119. At block 440, method 400 determines whether the application server(s) 118 have reached the saturation point and whether a new application server instance 118 was provisioned. Application server measurement module 302 may use the application server measurement data 324 to determine if the saturation point was reached. As described above, the saturation point may be reached when the performance level of the application servers 118 drops below a certain threshold, starts decreasing, or when the application server 118 is unable to handle additional requests. Cloud controller 114 is configured to automatically provision (or spawn) a new instance of application server 118 when system under test 220 reaches the saturation point. If, at block 440, method 400 determines that either the saturation point was not reached, or a new application server instance 118 was not provisioned, method 400 returns to block 410 and repeats the steps of blocks 410-430 until the saturation point is reached.

Once the saturation point is reached, at block 450, method 400 records the performance statistics of the application servers 118 in system under test 220. Application server measurement module 302 stores the data as performance statistics 326 in storage device 119 for later use in analysis of the system.

Figure 5:
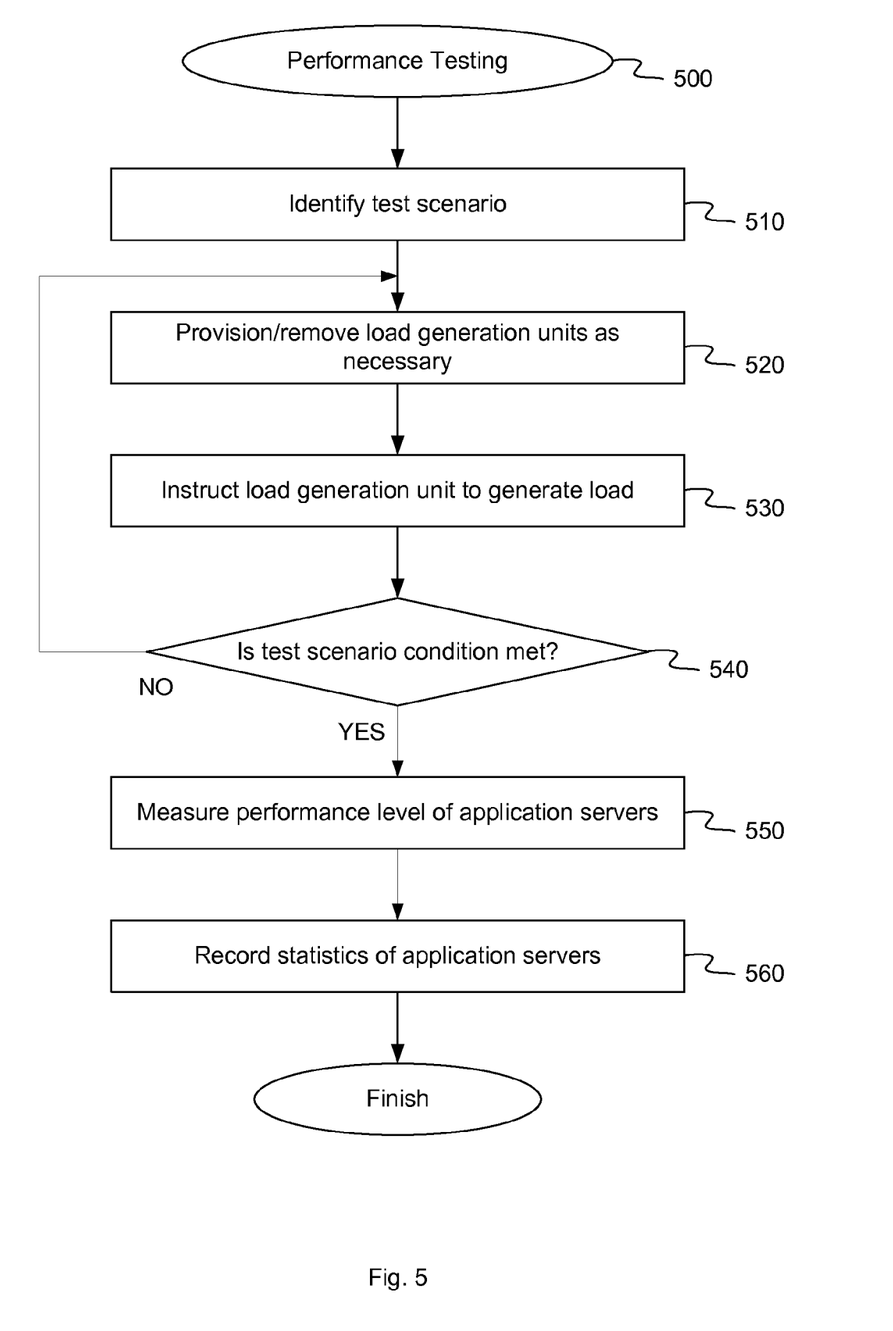
FIG. 5 is a flow diagram illustrating a performance testing method, according to another embodiment.

FIG. 5 is a flow diagram illustrating a performance testing method, according to another embodiment of the present invention. The method 500 may be performed by processing logic configured to test the performance of an application server or servers in a cloud based computing environment. In one embodiment, method 500 may be performed by test controller 116, as shown in FIGS. 1, 2 and 3.

Referring to FIG. 5, at block 510, method 500 identifies a test scenario for performance testing of system under test 220. The test scenario may be a set of conditions that define how and/or when a load should be applied to system under test 220. The test scenario may be stored in test scenario storage 322 in storage device 119. In one embodiment, test scenario identifier module 310 receives user input specifying a particular test scenario or selects a default test scenario. At block 520, method 500 provisions or removes load generation units 212 as necessary. In accordance with the test scenario, test scenario identifier module 310 instructs load generation unit spawn module 304 to provision or remove a load generation unit 212 from load generation pool 210. For example, the test scenario may specify a certain number of load generation units 212 be used, and load generation unit spawn module 304 makes the changes to load generation pool 210 as necessary.

At block 530, method 500 instructs the load generation units 212 in load generation pool 210 to generate a load. Load generation control module 306 may send a message to the load generation unit 212 instructing it to generate a load of a certain size for a certain duration. The size of the load may be dictated, for example, by one or more conditions of the test scenario. In response, the load generation units 212 apply the load to system under test 220.

At block 540, method 500 determines if the conditions of the test scenario are met. Test scenario identifier module 310 may receive an indication, for example, of how may load generation units have been provisioned or the current size of the load being applied to system under test 220. If that indication matches the conditions of the test scenario, method 500 proceeds to block 550, where method 500 measures a performance level of the application servers 118 in system under test 220. At block 560, method 500 records the performance statistics of the application servers 118 in system under test 220. Application server measurement module 302 stores the data as performance statistics 326 in storage device 119 for later use in analysis of the system. If at block 540, method 500 determines that the test scenario conditions are not met, method 500 returns to block 520 and repeats the steps at blocks 520 and 530 until the test scenario conditions are satisfied.

Figure 6:
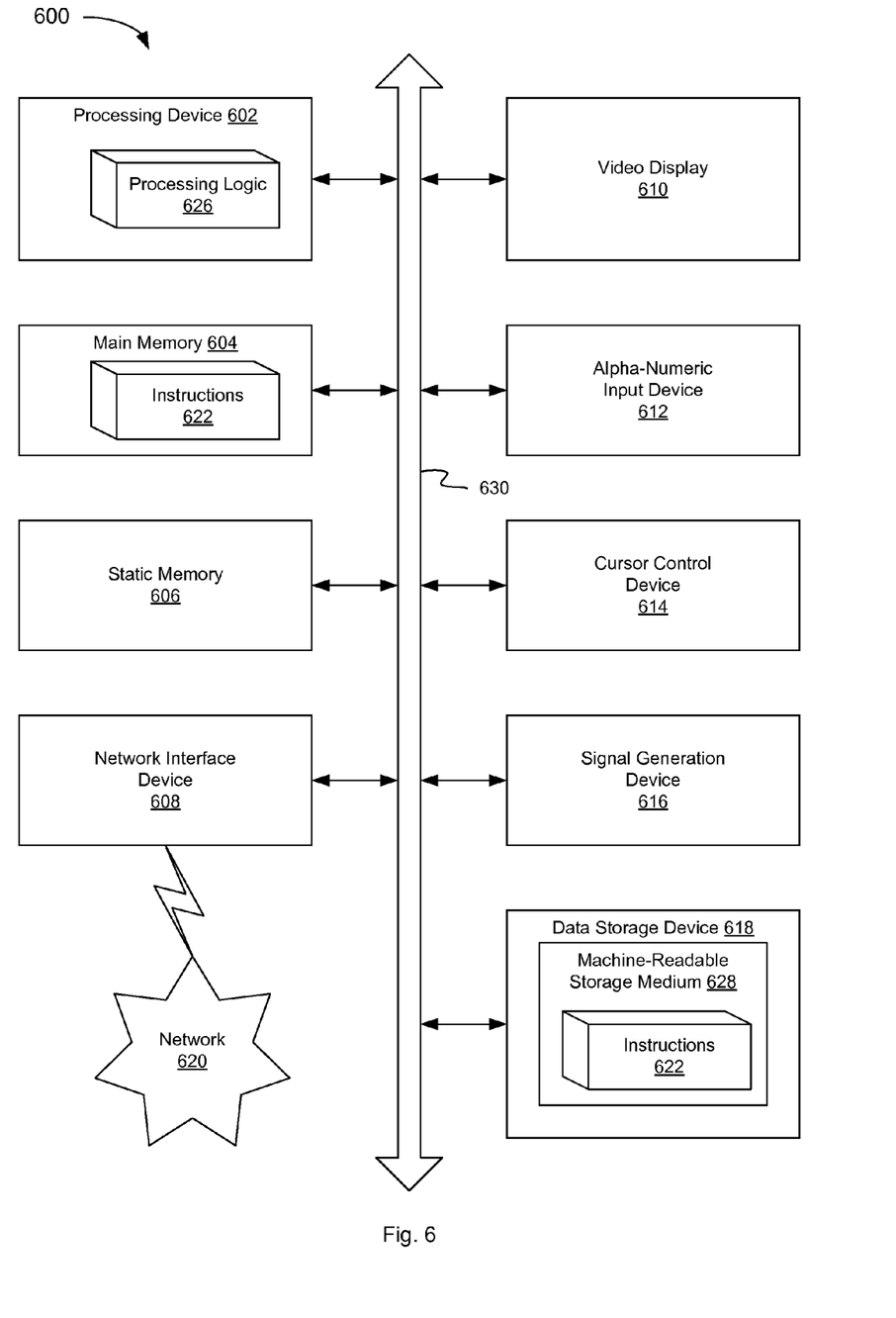
FIG. 6 is a block diagram illustrating one embodiment of a computer system, according to an embodiment.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of one of host cloud controller 114, test controller 116, application server 118 or load generation unit 212.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 628, on which is stored one or more set of instructions 622 (e.g., software) embodying any one or more of the methodologies of functions described herein. The instructions 622 may also reside, completely or at least partially, within the main memory 604 and/or within the processing device 602 during execution thereof by the computer system 600; the main memory 604 and the processing device 602 also constituting machine-accessible storage media. The instructions 622 may further be transmitted or received over a network 620 via the network interface device 608.

The machine-readable storage medium 628 may also be used to store instructions to perform a method of testing the performance of an application server or servers in a cloud based computing environment. While the machine-readable storage medium 628 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method, comprising:
provisioning, by a processing device, a first load generation unit in a cloud computing environment;
instructing the first load generation unit to generate a first load and apply the first load to a first application server instance in the cloud computing environment, wherein the first load comprises a Hypertext Transfer Protocol (HTTP) request;
measuring a performance level of the first application server instance to determine when the first application server instance reaches a saturation point;
when the first application server instance reaches the saturation point, recording a performance statistic of the first application server instance, the performance statistic comprising a time between the first application server instance reaching the saturation point and when a second application server instance is provisioned in the cloud computing environment in response to the first application server instance reaching the saturation point; and
when the first application server instance does not reach the saturation point, provisioning a second load generation unit and instructing the second load generation unit to generate a second load and apply the second load to the first application server instance while the first load generation unit continues to apply the first load to the first application server instance.

2. The method of claim 1, wherein the performance level comprises at least one of a number of requests processed per second, a response time to a request or a number of processing device transactions per second.

3. The method of claim 1, wherein the saturation point comprises at least one of the performance level of the first application server instance dropping below a threshold, the performance level decreasing or the first application server instance being unable to handle an additional load.

4. The method of claim 1, wherein the load generated and applied to the first application server instance is defined by a test scenario.

5. A system comprising:
a processing device;
a memory coupled to the processing device; and
a test controller, executable by the processing device from the memory, to:
provision a first load generation unit in a cloud computing environment;
instruct the first load generation unit to generate a first load and apply the first load to a first application server instance in the cloud computing environment, wherein the first load comprises a Hypertext Transfer Protocol (HTTP) request;
measure a performance level of the first application server instance to determine when the first application server instance reaches a saturation point;
when the first application server instance reaches the saturation point, record a performance statistic of the first application server instance, the performance statistic comprising a time between the first application server instance reaching the saturation point and when a second application server instance is provisioned in the cloud computing environment in response to the first application server instance reaching the saturation point; and
when the first application server instance does not reach the saturation point, provision a second load generation unit and instructing the second load generation unit to generate a second load and apply the second load to the first application server instance while the first load generation unit continues to apply the first load to the first application server instance.

6. The system of claim 5, wherein the performance level comprises at least one of a number of requests processed per second, a response time to a request or a number of processing device transactions per second.

7. The system of claim 5, wherein the saturation point comprises at least one of the performance level of the first application server instance dropping below a threshold, the performance level decreasing or the first application server instance being unable to handle an additional load.

8. The system of claim 5, wherein the load generated and applied to the first application server instance is defined by a test scenario.

9. A non-transitory machine-readable storage medium storing instructions which, when executed, cause a processing device to perform operations comprising:
- identifying, by the processing device, a test scenario comprising a condition for testing a performance level of a first application server instance in a cloud computing environment;
- provisioning a first load generation unit in the cloud computing environment according to the condition;
- instructing the first load generation unit to generate a first load and apply the first load to the first application server instance according to the condition, wherein the first load comprises a Hypertext Transfer Protocol (HTTP) request;
- measuring the performance level of the first application server instance;
- recording a performance statistic of the first application server instance, the performance statistic comprising a time between the first application server instance reaching a saturation point and when a second application server instance is provisioned in the cloud computing environment in response to the first application server instance reaching the saturation point; and
- when the first application server instance does not reach the saturation point, provisioning a second load generation unit and instructing the second load generation unit to generate a second load and apply the second load to the first application server instance while the first load generation unit continues to apply the first load to the first application server instance.

10. The storage medium of claim 9, wherein the performance level comprises at least one of a number of requests processed per second, a response time to a request or a number of processing device transactions per second.

11. The storage medium of claim 9, wherein the operations further comprise:
- determining if the condition of the test scenario is satisfied.

12. The storage medium of claim 11, wherein the operations further comprise:
- removing a load generation unit according to the condition.

* * * * *